Patented Oct. 7, 1924.

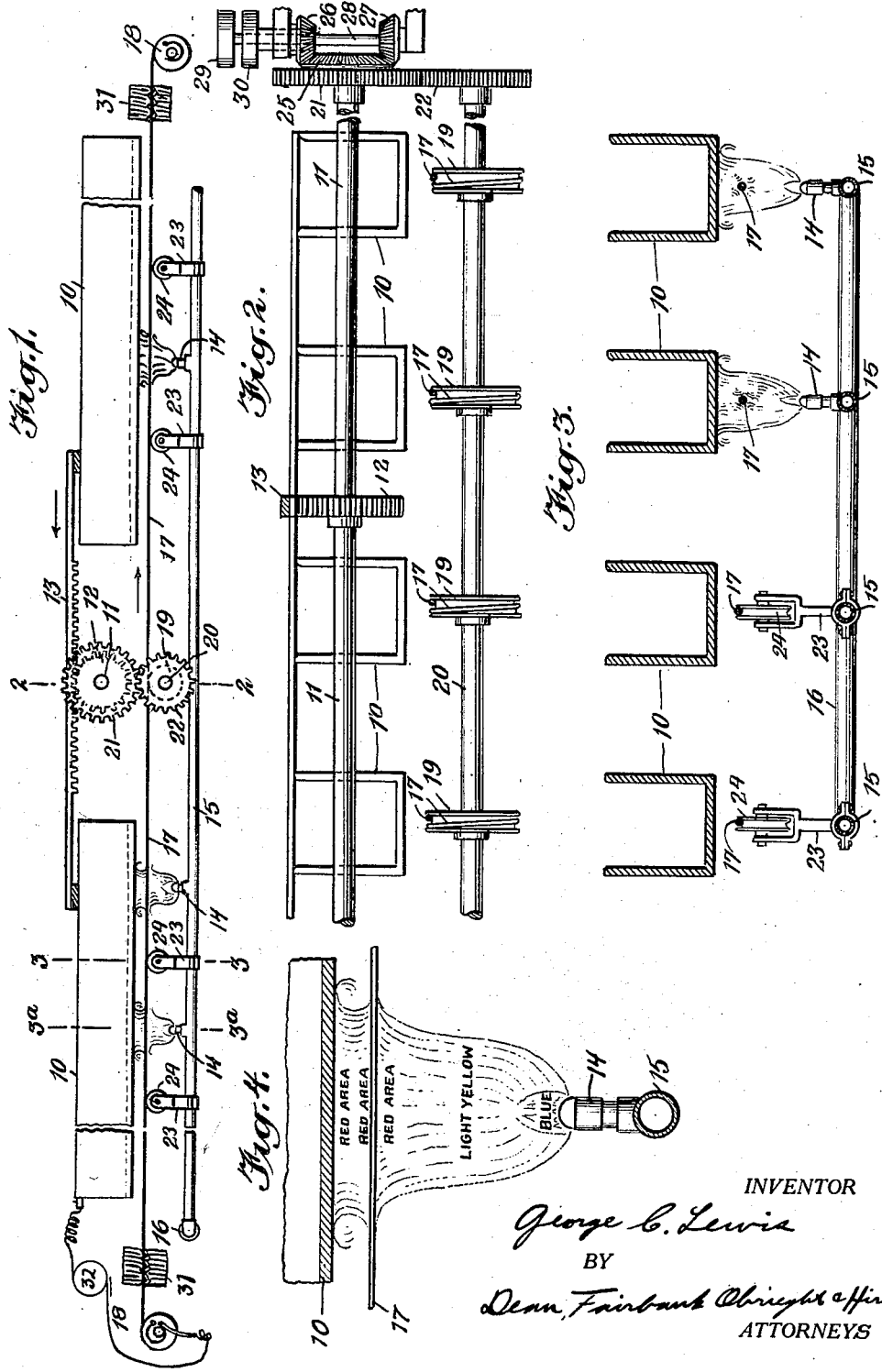

1,510,485

UNITED STATES PATENT OFFICE.

GEORGE CHARLES LEWIS, OF NEW DORP, NEW YORK, ASSIGNOR TO COLUMBIAN CARBON COMPANY, OF WILLIAMSPORT, PENNSYLVANIA, A CORPORATION OF DELAWARE.

PRODUCTION OF CARBON BLACK.

Application filed March 30, 1923. Serial No. 628,721.

*To all whom it may concern:*

Be it known that I, GEORGE C. LEWIS, a subject of the King of England, and resident of New Dorp, in the county of Richmond and State of New York, have invented certain new and useful Improvements in the Production of Carbon Black, of which the following is a specification.

When carbonaceous substances are caused to burn the conditions may be so controlled as to give incomplete combustion of the carbon and the formation of solid particles containing free carbon. Changes in the material being burned, the manner in which the complete combustion is prevented, and the manner in which the sooty or other solid matter is deposited or collected, result in wide variations in the percentage as well as the physical characteristics of the free carbon in the solid carbonaceous matter which is deposited or collected.

Various different grades or kinds of carbon produced by incomplete combustion are on the market, and the variation in purity, physical characteristics and cost determine to a large extent the grade or kind which is used commercially for any specific purpose.

The variety or material known as carbon black is produced by the impinging of a hydrocarbon flame or mass of yellow-to-white incandescent hydrocarbon particles on a metal surface of lower temperature. Carbon which is thus impinged has different characteristics from any other black not so impinged, as for instance that produced in a smoky flame or by explosion with insufficient oxygen. This is probably due to a certain crucial heat at the moment of impingement and sudden cooling. The particles are harder and more brilliant and possibly crystalline. They are not an absolute black, but are a faint shade of red with lesser tones of yellow and blue. Lamp black and those carbon particles produced by dissociation of hydrocarbon gas by heat, explosion, or electricity, have more blue, less red, less tinctorial strength, are softer, and have greater mobility or less viscosity than true carbon black produced by impingement of the flame on a metal surface.

The properties which distinguish true carbon black from blacks produced in other ways render the carbon black of special value in certain industries. For instance, the hardness of the particles of the carbon black is considered of importance in the manufacture of rubber tires, this being due no doubt to its superior abrasive quality over the softer blacks.

The yield of carbon black from a hydrocarbon gas is less than that of the soft blacks above referred to, this being due to the fact that a larger amount of the carbon is combined with the oxygen supporting the combustion.

The main object of my invention is to increase the yield of carbon black which can be produced from a hydrocarbon flame acting on a cooler metal surface. Many attempts have been made to accomplish this general result, but none, so far as I know, has given satisfactory results. The common practice is to arrange the flames so that they act upon the web of a channel moved back and forth endwise at the proper rate, the carbon black being scraped off from the metal surface. Attempts have been made to increase the yield by lowering the temperature of the surface on which the carbon black is impinged, as for instance by water-cooling said surface. This is not satisfactory, for when the plates or other metal surfaces are not of sufficiently high temperature there occurs a condensation of moisture and an appreciable amount of the carbon separates in flakes or sooty form and does not deposit on the plate, nor is it impinged thereon. These carbon particles have less red and more blue undertone, are softer and are analogous to the oil lamp blacks which are produced by smoky flames and precipitated from the air.

As one of the main features of my invention I reduce the temperature of the flame while keeping the temperature of the plate or surface on which the carbon particles are impinged sufficiently high for the proper formation of the carbon black having the desired properties. In order to accomplish this I pass a heat conducting member through the flame at a distance from the depositing plate, and at a point just above the point of maximum heat of the flame. The conducting member is preferably in the form of a metal rod which is moved endwise so as to disturb the flame to the least possible degree, and acting not only to conduct heat from the flame by direct conduction, but also to continually bring cooler portions into direct action in the flame. This heat lost from the flame reduces the temperature of the area of maximum heat to a point where the flame is reduced in color from a light yellow to a deeper or reddish yellow, and of a color similar to that at its point of impingement on the depositing surface. Thus, instead of a thin section of the flame adjacent to the depositing surface being of the necessary temperature and color to release its free carbon on to the plate, I produce a much greater area or mass of incandescent particles of the correct or crucial temperature to release carbon and prevent its combining with oxygen to give complete combustion. It is desirable that the metal rod be moved in operation, as otherwise it would assume the function of the plate and be coated with carbon, which would eventually cake and ignite and cause trouble such as choking the burners by dropping on to them. Therefore I pass the rod at such a rate of motion through the flame as to not permit sufficient time to elapse for the depositing or building up of the carbon which is an essential feature in the manufacture of true carbon black.

If the flame be of the usual size and of fish-tail form, I preferably make the metal rod ductile and of very small size and pass it at a distance from the depositing plate equal to about one-quarter to one-fifth the length of the flame. Thus if the flame from the burning gas be two to two and one-half inches in height, the rod would be approximately one-half an inch below the plate. By making the rod of ductile material, it may be wound on and unwound from drums, or may be passed over pulleys, and the proper speed obtained by simple mechanism. This speed is determined by the length of the depositing surface, the number of flames, the type and size of flame, the raw material used, and the grade of carbon black required.

As a further important feature I employ for the rod or other flame cooling member, a metal different from that of the depositing plates, as there appears to be some form of catalytic action. I have found that copper or nickel or alloys of these metals operate very efficiently.

As a further important feature of my invention I increase the yield of carbon black by the passage of an electric current through the flame, or the charging of the flame with such a current. For instance the depositing plate and the cooling rod may be connected to the opposite poles of a source of electrical energy, the plate being positive and the rod negative. The current will pass from one to the other through the flame, and I have discovered that in this way I can secure a greater yield of true carbon black deposited on the plate, and at the same time can produce an appreciable amount of soft blue black of the nature of lamp black, which will not deposit on the plate but may be collected when it settles out from the air and gaseous products of combustion.

In producing the electric current it is not essential that the depositing plate form a part of the electric circuit. Two of the fine metal rods may be used instead of a single rod, and the current caused to pass through the flame from one rod to the other. The black produced by this electrolytic process is of particular value in the manufacture of high grade printing inks, and other liquid vehicles owing to its superior undertones and softness.

My invention may be carried out with various different specific forms of apparatus, and therefore that shown in the accompanying drawings is to be considered in an illustrative rather than in a limiting sense.

In these drawings:

Fig. 1 is a somewhat diagrammatic side elevation of an apparatus constructed in accordance with my invention.

Fig. 2 is a transverse section on the line 2—2 of Fig. 1.

Fig. 3 is a section partly on the line 3—3 and partly on the line 3ª—3ª of Fig. 1, and Fig. 4 is a view on a larger scale, showing the positioning of the flexible rod in the flame, and indicating the effect thereof.

In the apparatus illustrated there are provided a plurality of depositing plates in the form of channels 10 arranged end to end in pairs, and provided with means for moving them back and forth endwise. This includes a transverse shaft 11 provided with a rack gear 12 meshing with a rack bar 13, the opposite ends of which are connected to the several channels upon opposite sides of the shaft. By rotating the shaft first in one direction and then in the other, the channels are caused to move back and forth endwise. I have not illustrated any specific mechanism for supporting or guiding the channels as such forms no portion of my invention and may follow established practice.

Beneath each channel are a plurality of burners 14 so positioned that the upper portion of the flame from the burner plays on the under surface of the web or plate forming the bottom of the channel. The burners for each channel may be arranged in a row along a gas line 15, and the several gas lines may be connected together by a header 16.

As one of the important features of my invention I provide a rod 17 positioned below and substantially parallel to each channel and movable endwise through the row of flames beneath the channel. This rod is shown as a flexible wire, the opposite ends of which are secured to drums 18, each drum having a spring or other means tending to rotate it in such position as to hold the rod taut. Intermediate of its ends the rod is wound one or twice around a grooved pulley 19 carried by a shaft 20, the single shaft having separate pulleys for the several rods beneath the row of channels. The shafts 11 and 20 are connected by meshing gears 21—22, so that as one shaft rotates in one direction the other will be rotated in the opposite direction. The relative sizes of the gears 21—22, the rack gear 12, and the pulley 19, are such that the speed of movement of the rod 17 is greater than that of the channels. The ratio shown is such that the speed of the rod will be about one and one-half times that of the channel, and as previously noted, the gearing is such that the direction of movement of one is opposite to that of the other. To hold the rods in proper position in respect to the flames, the gas lines 15 may have brackets 23 supporting idlers 24 which guide and support the flexible rod. Any suitable means may be employed for rotating one of the shafts first in one direction and then in the other. As illustrated, the shaft 11 has a bevelled gear 25 meshing with two pinions 26 and 27. The pinion 27 is mounted on a shaft 28, while the pinion 26 is on a sleeve loose on the shaft 28. The shaft 28 and the sleeve have separate driving pulleys 29 and 30 closely adjacent to each other so that a drive belt may be intermittently shifted from one pulley to the other. When the drive belt is on one pulley the shaft 11 will be rotated in one direction, and when on the other, the shaft will rotate in the opposite direction.

I have employed the term "rod" to indicate the flame cooling member 17, but it will be apparent that I do not wish to be restricted to any particular size by this term. In fact the rod in most cases will be of very small size and flexible, and properly designated as a wire.

I have illustrated only a single rod passing through each flame, but it will be apparent that by a mere duplication a second rod might be arranged parallel to the first, and moved at the same or different speed and in the same or the opposite direction.

I have not illustrated the ordinary means for scraping the carbon black from the under side of the channels as this forms no portion of my invention. Ordinary brushes 31 or any other suitable means might be employed for removing from the rod 17 such carbon black as accumulates thereon. For causing electric current to flow through the flame for the purpose hereinbefore set forth, any ordinary electrical connections may be employed. I have illustrated a source of electrical energy 32 with one pole connected to a channel and the other to the shaft of one of the drums 18, so that the current will pass through the flame from the rod to the channel. Of course the supports for these members of opposite polarity must be so insulated from each other as to prevent the flow of the current except through the flame.

In Fig. 4 I have illustrated the preferred position of the flexible rod in respect to the depositing plate and the burner, and have indicated in a general way the effect of the rod. If no rod be used the only portion of the flame having a decided reddish color will be that closely adjacent to the under surface of the depositing plate, whereas by the use of the rod which cools the flame the red area is extended down to a very much greater distance and a very much larger percentage of the carbon of the hydrocarbon gas is deposited in the form of carbon black.

Having thus described my invention, what I claim as new and desire to secure by Letters Patent is:

1. The method of increasing the yield of carbon black produced by the impinging of a flame on a cooler surface consisting in cooling a portion of the flame spaced from said surface.

2. The method of increasing the yield of carbon black produced by the impinging of a flame on a cooler surface consisting in radiating heat from the flame by means of a conductor extending transversely through the flame substantially parallel to the surface of impingement.

3. The method of increasing the yield of carbon black produced by the impinging of a flame on a cooler surface consisting in cooling the flame at a point spaced from the point of impingement by passing a member back and forth through the flame.

4. The method of increasing the yield of carbon black produced by the impinging of a flame on a cooler surface consisting in cooling the flame at a point spaced from the point of impingement by passing a rod back and forth endwise through the flame.

5. The method of increasing the yield of carbon black produced by the impinging of a flame on a cooler surface consisting in passing a metal rod through the flame at a point spaced from the surface of impingement.

6. The method of increasing the yield of carbon black produced by the impinging of a flame on a cooler surface consisting in passing a metal rod endwise through the flame at a point spaced from the surface of impingement substantially parallel to said surface.

7. The method of producing carbon black which includes causing a flame to lick a cooler surface, and independently cooling a portion of the flame at a point spaced from said surface.

8. The method of producing carbon black which includes causing a flame to lick a cooler surface, independently cooling a portion of the flame at a point spaced from said surface, and maintaining the desired difference in temperature by an endwise movement of said surface, and cooling means in respect to the flame.

9. The method of increasing the yield of solid carbonaceous deposits from a flame, consisting in causing the flame to play upon a metal surface and passing an electric current through the flame.

10. The method of increasing the yield of solid carbonaceous deposits from a flame, consisting in causing the end portion of the flame to play upon a metal surface, radiating heat from the body portion of the flame through a separate heat conductor, and causing an electric current to pass through said flame between said surface and said conductor.

11. The method of producing carbonaceous deposits from a flame consisting in moving a metal member endwise through the tip portion of the flame and passing a second metal member through the flame in the opposite direction.

12. The method of producing carbonaceous deposits from a flame consisting in moving a metal member endwise through the tip portion of the flame and passing a second metal member through the flame at a higher speed.

13. The method of producing carbonaceous deposits from a flame consisting in moving a metal member endwise through the tip portion of the flame and passing a second metal member through the flame and causing an electric current to pass through the flame between the surface and the conducting member.

14. An apparatus for producing carbon black, including means for producing a flame and a member on which the flame plays and on which the carbon black is deposited, in combination with means for cooling the flame at a point spaced from said member.

15. An apparatus for producing carbon black, including means for producing a flame and a member on which the flame plays and on which the carbon black is deposited, in combination with a rod extending through the flame at a point spaced from said member.

16. An apparatus for producing carbon black, including means for producing a flame and a member on whch the flame plays and on which the carbon black is deposited, in combination with a heat conducting rod movable endwise through the flame.

17. An apparatus for producing carbon black, including means for producing a flame and a member on which the flame plays and on which the carbon black is deposited, in combination with a flexible metal rod movable endwise through the flame substantially parallel to the surface of said member.

18. An apparatus for producing carbon black including means for producing a flame, a plate having a surface upon which the end portion of the flame plays, and a rod extending through said flame parallel to said surface.

19. An apparatus for producing carbon black including means for producing a flame, a plate having a surface upon which the end portion of the flame plays, a rod extending through said flame parallel to said surface, and means for moving said rod back and forth endwise.

20. An apparatus for producing carbon black including means for producing a flame, a plate having a surface upon which the end portion of the flame plays, a rod extending through said flame parallel to said surface, means for moving said plate back and forth, and means for moving said rod back and forth at a different rate of speed.

21. An apparatus for producing carbon black including means for producing a flame, a plate having a surface upon which the end portion of the flame plays, a rod extending through said flame parallel to said surface, means for moving said plate endwise, and means for moving said rod endwise and in the opposite direction.

22. An apparatus for producing carbon black including means for producing a flame, a plate having a surface upon which the end portion of the flame plays, a rod extending through said flame parallel to said surface, a drive shaft, connections between said drive shaft and said plate for moving the latter back and forth, and connections between said drive shaft and said rod for moving the latter back and forth.

23. An apparatus for producing carbon black including means for producing a flame, a plate on which the flame plays and and on which carbon black is deposited, a spring roller adjacent to one end of the plate, a drum adjacent to the opposite end, a flexible metal rod wound on said spring roller and said drum and extending through said flame substantially parallel to said plate, and movable back and forth endwise upon oscillation of the drum.

24. An apparatus for producing carbon black including means for producing a flame, a metal member on which the flame plays and upon which the carbon black is deposited, and a flexible rod movable endwise back and forth through the flame and formed of a metal different from that of said member.

25. An apparatus for producing carbon black including means for producing a flame, a metal member on which the flame plays and upon which the carbon black is deposited, and a flexible nickel rod movable endwise back and forth through the flame.

26. An apparatus for producing carbonaceous deposits from a flame, including means for passing an electric current through the flame.

27. An apparatus for producing carbonaceous deposits from a flame, including means for passing an electric current through the flame, including a member upon which the flame plays, a member extending through the flame, and means for causing an electric current to pass through the flame from one member to the other.

28. The method of producing carbonaceous deposits from a flame, consisting in cooling the flame at a point closely adjacent to but above the point of maximum heat.

29. The method of producing carbonaceous deposits from a flame, consisting in increasing the reddish yellow area of the flame and decreasing the light yellow area.

30. The method of producing carbonaceous deposits from a flame, consisting in increasing the reddish yellow area of the flame and decreasing the light yellow area by cooling the flame at a point directly above the blue area.

31. The method of producing carbon black and lamp black from a single flame, consisting in playing the flame on a cooling surface, passing a cooling rod through the flame, and passing an electric current from one to the other in the flame.

Signed at New York, in the county of New York and State of New York, this 27th day of March, A. D. 1923.

GEORGE CHARLES LEWIS.